United States Patent [19]
Murieen, Sr.

[11] Patent Number: 5,267,528
[45] Date of Patent: Dec. 7, 1993

[54] ANIMAL GROOMING BRUSH

[76] Inventor: R. C. Murieen, Sr., 30832 Hwy. 96, Horse Creek, Calif. 96045

[21] Appl. No.: 34,742

[22] Filed: Mar. 18, 1993

[51] Int. Cl.$^5$ ............................................. A01K 13/00
[52] U.S. Cl. ........................................... 119/88; 119/83
[58] Field of Search .................... 119/29, 83, 85, 86, 119/88, 93; 15/238, 215, 216, 36, 37, 266; 132/263, 273, 275, 278

[56] References Cited

U.S. PATENT DOCUMENTS

| 1,280,204 | 10/1918 | Garber | 119/88 |
| 2,781,239 | 2/1957 | Dick et al. | 119/88 |
| 2,916,757 | 12/1959 | Peilet et al. | 15/184 |
| 3,059,260 | 10/1962 | Peilet | 119/88 |
| 3,108,305 | 10/1963 | Peilet | 15/169 |
| 3,368,554 | 2/1968 | Chou | 128/67 |
| 4,184,279 | 1/1980 | Peilet | 40/314 |
| 4,574,416 | 3/1986 | Stewart et al. | 119/88 X |
| 4,860,692 | 8/1989 | Beard | 119/88 |

Primary Examiner—Gene Mancene
Assistant Examiner—Thomas Price
Attorney, Agent, or Firm—Jacobson, Price, Holman & Stern

[57] ABSTRACT

An elongated handle is provided including a large plan area head on one end outwardly from which a plurality of laterally spaced tines project and a hair stripping plate closely overlies the side of the head from which the tines project and is equipped with apertures through which the tines project to an extent that they project appreciably from the side of the plate remote from the head. Structure is provided whereby the plate is yielding biased toward the head and the plate is guideingly supported from the handle for movement away from the head to a position with the free ends of the tines at least closely adjacent the side of the plate remote from the head and there is provided, shiftable with the plate relative to the handle, a hand digit engageable portion which may be readily engaged by a digit of a hand encircling the handle in order to apply a thrust thereon for shifting the plate away from the head.

11 Claims, 1 Drawing Sheet

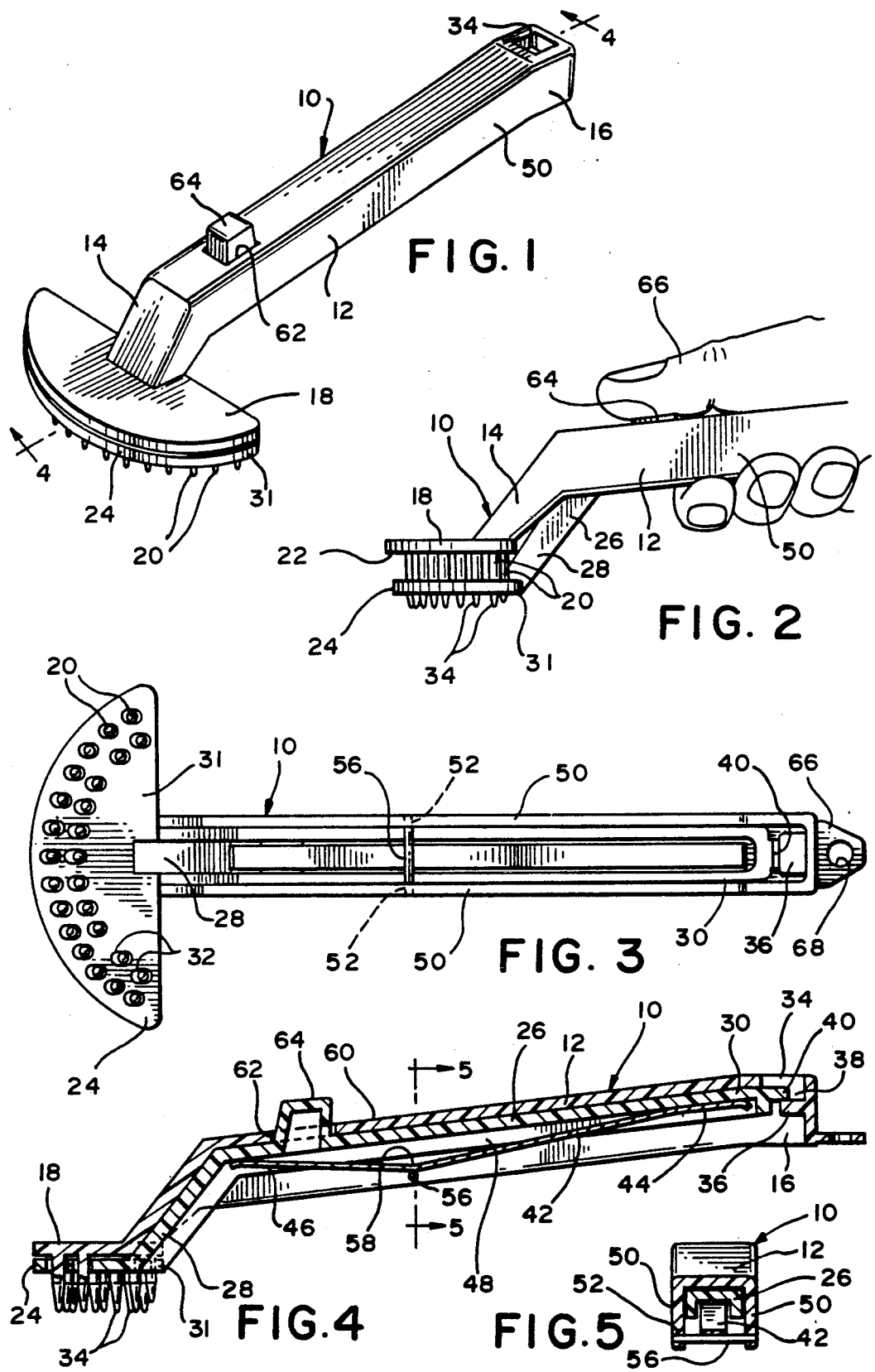

ANIMAL GROOMING BRUSH

BACKGROUND OF THE INVENTION

1. Field of the Invention

The instant invention incorporates a substantially planar or concave brush head supported from one end of a handle and the brush head includes a plurality of spaced apart tines projecting outwardly therefrom, an apertured plate being supported closely adjacent the head with the tines projecting through the apertures and appreciably therebeyond. The plate is mounted for limited movement away from the head in order to strip hair clinging to the tines thereof and the plate is yieldingly biased toward the head.

2. Description of Related Art

Various different forms of brushes and other similar devices heretofore have been provided with structure thereon for removing hair clinging to the bristles or tines of the brushes. Examples of these previously known devices are disclosed in U.S. Pat. Nos. 2,916,757, 3,059,260, 3,108,305, 3,368,554 and 4,184,279.

However, these previously known devices do not include the overall combination of structural and operational features incorporated in the instant invention.

SUMMARY OF THE INVENTION

The brush of the instant invention is unique in that it is constructed of two readily molded major plastic components, a leaf spring and a retaining pin, or in lieu thereof, a rubber band and molded retaining tabs, only.

The brush is designed to be used in conjunction with animals for grooming the hair coats thereof and provision is provided whereby hair clinging to the tines of the brush may be readily removed therefrom.

The main object of this invention is to provide an animal grooming brush which incorporates structure for readily removing hair clinging to the tines of the brush.

Another object of this invention is to provide a brush in accordance with the preceding object and which may be readily mass produced and assembled at low cost.

Another very important object of this invention is to provide a brush utilizing only two major molded plastic components as well as a simple leaf spring and retaining pin and which may be readily assembled.

A further object of this invention is to provide an animal grooming brush whose overall configuration enables the brush to be comfortably used by pulling the brush through the hair rather than pushing the brush.

A final object of this invention to be specifically enumerated herein is to provide an animal grooming brush in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of an animal grooming brush constructed in accordance with the present invention;

FIG. 2 is a fragmentary side elevational view illustrating the manner in which the brush may be hand supported and also the manner in which the hair stripping plate may be actuated to strip hair from the tines of the brush;

FIG. 3 is an enlarged bottom plan view of the brush;

FIG. 4 is an enlarged fragmentary longitudinal vertical sectional view taken substantially upon the plan indicated by the section line 4—4 of FIG. 1; and FIG. 5 is a transverse vertical sectional view taken substantially upon the plan indicated by the section line 5—5 of FIG. 4.

DESCRIPTION OF THE PREFERRED EMBODIMENT

Referring now more specifically to the drawings the numeral 10 generally designates the brush of the instant invention which incorporates an elongated handle 12 having base and free ends 14 and 16. The base end includes a first enlarged head 18 thereon having a plurality of spaced apart tines 20 formed integrally therewith and projecting laterally outwardly of one side 22 of the head 18.

A hair mat stripper 24 also is provided and incorporates an elongated lever 26 having first and second ends 28 and 30 with a second enlarged plate-like head 31 closely overlying the surface 22 and provided with apertures 32 therethrough. The apertures 32 are elongated longitudinally of the handle 26 for a reason to be hereinafter more fully set forth and at least the free ends of the tines 20 are tapered as at 34.

The base end of the handle 12 is angled downwardly, as is the first end 28 of the lever 26, and the handle 12 (including the base end 14) is channel shaped and snugly receives the lever 26 and the first end 28 therein.

The free end 16 of the handle 12 includes an opening 34 therein which cooperates with an integral shelf portion 36 within the free end 16 of the handle 12 in order to define a socket 38 which opens longitudinally of the handle 12 toward the base end 14 thereof.

The second end 30 of the lever 26 includes a tab 40 which projects endwise outwardly therefrom and is received within the socket 38 and a leaf spring 42 is provided and has one end 44 thereof seated within the second end 30 of the lever 26 and the other end 46 thereof seated within the opposite end of the lever 26 adjacent the downwardly directed first end 28 thereof, the lever 12 also defining a downwardly opening channel 48 in which the leaf spring 42 is received. The opposite side flange portions 50 of the channel shaped handle 12 include registered transverse bores 52 formed therein and a retaining pin 56 has its opposite ends fictionally retained in the bores 52 and its midportion engaged immediately beneath the apex portion 58 of the leaf spring 42. In this manner, the opposite ends of the leaf spring 42 upwardly bias corresponding ends of the lever 26 (as viewed in FIG. 4) to seat the channel shaped lever 26 within the channel shaped handle 12. In this position, the second plate-like head 30 is positioned closely beneath the first plate-like head 18.

The bight portion 60 of the channel shaped handle 12 extending between the flanges 50 is provided with an opening 62 adjacent the downwardly directed base end 14 of the handle 12 and a corresponding portion of the lever 26 is provided with a projection 64 which projects upwardly through the opening 62 when the handle 12 and lever 26 are in the relative positions thereof illustrated in FIG. 3 with the second head 30 closely underlying the head 18.

After the brush 10 has been used, hair clings to those positions of the tines 34 which project below the second head 30 and, when it is desired to strip the collected hair from the tines 34, the projection 64 is depressed by the thumb 66 of the hand of the user encircling the handle 12, see FIG. 2. As the projection 64 is depressed, the first end 28 of the lever 26 is angularly displaced about the socket and tongue connection 38, 40 whereby the second head 30 is moved downwardly along the tines 20 for stripping the hair therefrom.

It will be noted that the apertures 32 are elongated longitudinally of the handle 12 in order to compensate for the angular displacement of the lever 26 as it is shifted between the positions thereof illustrated in FIGS. 2 and 4 without interference between the tines 20 and the edges of the aperture 32.

In addition, it is believed readily apparent from FIG. 2 that the head 31 does not totally disengage from the tines 20, even when the projection 64 is completely depressed past the partially depressed position thereof illustrated in FIG. 2. In this manner, the tines 20 are always engaged through the apertures 32, which engagement of the tines 20 through the apertures 32 controls lengthwise shifting of the lever 26 relative to the handle 12 in a manner limiting inner displacement of the tongue 40 relative to the socket 38 and outward displacement of the tongue 40 relative to the socket 38. Accordingly, the handle 12 and lever 26, after being properly relatively positioned as illustrated in FIG. 4 and through the utilization of the leaf spring 42 and the pin 56, are automatically joined together for proper operation of the brush 10 independent of the usage of any other fasteners. Thus, a single fastener (the pin 56) not only mounts the lever 26 within the handle 12 against dislodgement therefrom, but also mounts the leaf spring 42 in operative position relative to the lever 26.

The free end of the handle 12 includes a tongue 66 projecting outwardly therefrom provided with an aperture 68 by which the brush 10 may be readily removably supported from a suitable support hook or the like. Further, the handle 12 and lever 26 are constructed of a plastic which may be readily molded. Thus, the actual cost of producing the various components of the brush 10 is maintained at an absolute minimum, the retaining pin 56 being merely fictionally retained in the bores 52.

The foregoing is considered as illustrative only of the principles of the invention. Further, since numerous modifications and changes will readily occur to those skilled in the art, it is not desired to limit the invention to the exact construction and operation as shown and described, and accordingly, all suitable modifications and equivalents may be resorted to, falling within the scope of the invention.

What is claimed as new is as follows:

1. An animal grooming brush including an elongated handle having base and free ends, said base end including a first enlarged head thereon having a plurality of spaced apart tines supported therefrom and projecting laterally outwardly of one side of said head in a direction transverse to said handle, a hair mat stripper incorporating an elongated lever having first and second ends, said first end including a second enlarged plate-like head thereon having apertures formed therethrough and disposed in a first position closely overlying said one side of said first head with said tines projecting appreciably through said apertures, mounting means mounting said second end of said lever from said free end of said handle for angular displacement of said lever relative to said handle enabling swinging of said second head outwardly of said one side and back thereetoward, said handle including a side opposite said one side and an opening formed therethrough adjacent said base end, said lever being disposed to the side of said handle corresponding to said one side and having a projection thereon projecting through said opening for engagement by a digit of a hand encircling said handle, whereby said projection may be depressed relative to said handle to swing said lever to a second position with said second head displaced outwardly of said one side to a position with the outer ends of said tines at least closely adjacent the side of said second head corresponding to said one side, and biasing means operatively connected between said handle and lever yieldingly biasing said lever toward said first position.

2. The brush of claim 1 wherein said handle defines a longitudinal channel therein opening outwardly of the side of said handle corresponding to said one side and in which a majority of the length of said lever is laterally received.

3. The combination of claim 2 wherein said mounting means a tab carried by and projecting endwise outwardly of said second end, said free end of said handle defining a socket opening outwardly longitudinally of said handle towards said base end and in which said tab is received.

4. The brush of claim 2 wherein said channel includes laterally spaced apart opposing side walls extending longitudinally of said handle between which said lever is guidingly received against lateral displacement relative to said handle .

5. The brush of claim 1 wherein at least the outer end portions of said tines taper toward the free ends thereof.

6. The brush of claim 5 wherein said apertures are elongated in a direction extending longitudinally of said handle.

7. The brush of claim 6 wherein said handle defines a longitudinal channel therein opening outwardly of the side of said handle corresponding to said one side and in which a majority of the length of said lever is laterally received.

8. The brush of claim 7 wherein said mounting means a tang carried by and projecting endwise outwardly of said second end, said free end of said handle defining a socket opening outwardly longitudinally of said handle towards said base end and in which said tang is received.

9. The brush of claim 8 wherein said channel includes laterally spaced apart opposing side walls extending longitudinally of said handle between which said lever is guidingly received against lateral displacement relative to said handle.

10. An animal grooming brush including an elongated channel member having base and free ends, opening laterally outwardly of one side of said channel member and including a first enlarged head on said base end having a large area side facing generally in the same direction in which said one side faces, said head being provided with laterally spaced apart tines projecting, generally, outwardly from said large area side in said direction, an elongated lever including first and second ends, said first end including a second enlarged plate-like head thereon having apertures formed therethrough and disposed in a first position closely overlying said one side with said tines projecting appreciably through said apertures, said free end defining a socket opening longitudinally of said channel member toward the base end thereof, said lever being snugly received in said channel with said second end including a tab received in said socket and said lever being angularly displaceable relative to said channel member as a result of said tab being received in said socket to swing said second head away from said first head to a second position with the outer ends of said tines at least closely adjacent the side of said second head remote from said first head, biasing means operatively connected between said channel member and lever yieldingly biasing said lever toward said first position, and digit engaging means on said lever engagable by a digit of a hand encircling said lever for applying manual thrust on said projection in said direction.

11. The brush of claim 10 wherein said base end of said channel member includes an aperture formed therethrough opening, at one end thereof, generally, in said direction, said digit engaging means projecting through said aperture and appreciably outwardly therefrom in a direction opposite the first mentioned direction.

* * * * *